(12) United States Patent
Dames et al.

(10) Patent No.: US 11,054,291 B2
(45) Date of Patent: Jul. 6, 2021

(54) ELECTROMAGNETIC FLOW SENSOR

(71) Applicant: SENTEC LTD, Cambridge (GB)

(72) Inventors: Andrew Nicholas Dames, Cambridge (GB); Carl Martin Hayton, Cambridge (GB)

(73) Assignee: SENTEC LTD, Cambridge (GB)

( * ) Notice: Subject to any disclaimer, the term of this patent is extended or adjusted under 35 U.S.C. 154(b) by 427 days.

(21) Appl. No.: 15/747,560

(22) PCT Filed: Jul. 28, 2016

(86) PCT No.: PCT/GB2016/052323
§ 371 (c)(1),
(2) Date: Jan. 25, 2018

(87) PCT Pub. No.: WO2017/017463
PCT Pub. Date: Feb. 2, 2017

(65) Prior Publication Data
US 2018/0216978 A1 Aug. 2, 2018

(30) Foreign Application Priority Data

Jul. 28, 2015 (GB) .................................... 1513271
Aug. 26, 2015 (GB) .................................... 1515159

(51) Int. Cl.
*G01F 1/58* (2006.01)
*G01F 15/14* (2006.01)
*G01F 15/18* (2006.01)

(52) U.S. Cl.
CPC ................ *G01F 1/588* (2013.01); *G01F 1/58* (2013.01); *G01F 15/14* (2013.01); *G01F 15/18* (2013.01)

(58) Field of Classification Search
CPC . G01F 1/588; G01F 1/58; G01F 15/18; G01F 15/14
See application file for complete search history.

(56) References Cited

U.S. PATENT DOCUMENTS

| 4,554,828 A | 11/1985 | Doll |
| 4,641,537 A | 2/1987 | Hansen et al. |

(Continued)

FOREIGN PATENT DOCUMENTS

| CN | 2115521 U | 9/1992 |
| CN | 2449199 Y | 9/2001 |

(Continued)

OTHER PUBLICATIONS

English language Abstract of CN102840356A.
(Continued)

*Primary Examiner* — Herbert K Roberts
*Assistant Examiner* — John M Royston
(74) *Attorney, Agent, or Firm* — Ware, Fressola, Maguire & Barber LLP

(57) ABSTRACT

An electromagnetic flow sensor for an electromagnetic flow meter (201) is disclosed. The sensor comprises a body (204) or frame, a flow passage (252) through the body or frame, a part of a magnetic circuit (248, 295) supported by the body or frame for applying a magnetic field across the flow passage, and at least first and second electrodes (298) supported by the body or frame, the at least first and second electrodes arranged to sense a voltage in response to a conductive fluid flowing through the flow passage. At least a portion of the body supporting the magnetic circuit part and the at least first and second electrodes is configured to be insertable into a flow tube (206) through a single aperture in the flow tube.

14 Claims, 12 Drawing Sheets

(56) References Cited

U.S. PATENT DOCUMENTS

| | | | |
|---|---|---|---|
| 5,325,728 A | 7/1994 | Zimmerman et al. | |
| 7,437,945 B1 | 10/2008 | Feller | |
| 2005/0000300 A1* | 1/2005 | Zingg | G01F 1/586 73/861.15 |
| 2009/0205400 A1* | 8/2009 | McPeak | G01F 1/58 73/1.16 |
| 2010/0107776 A1* | 5/2010 | Shanahan | G01F 1/60 73/861.11 |
| 2011/0314931 A1* | 12/2011 | Iijima | G01F 1/588 73/861.12 |

FOREIGN PATENT DOCUMENTS

| | | | |
|---|---|---|---|
| CN | 102840356 A1 | | 12/2012 |
| CN | 103140742 A | | 6/2013 |
| JP | H11-64048 A | * | 3/1999 |
| WO | 0019174 | | 4/2000 |
| WO | 02063250 A1 | | 8/2002 |

OTHER PUBLICATIONS

English language Abstract of CN2449199Y.
English language Abstract of CN2115521U.
English language Abstract of CN103140742A.

* cited by examiner

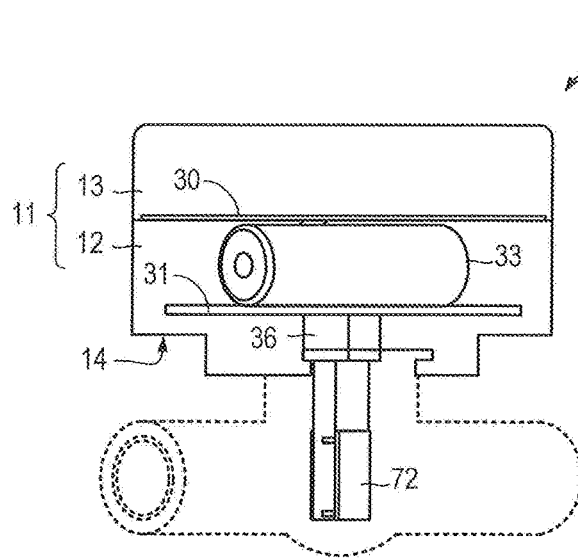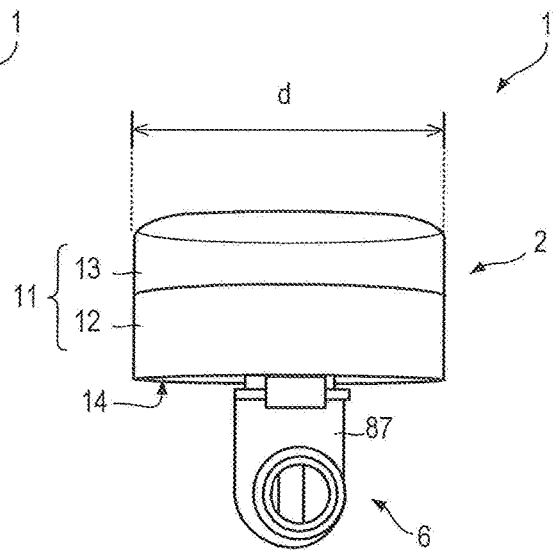
Fig. 2a          Fig. 2b
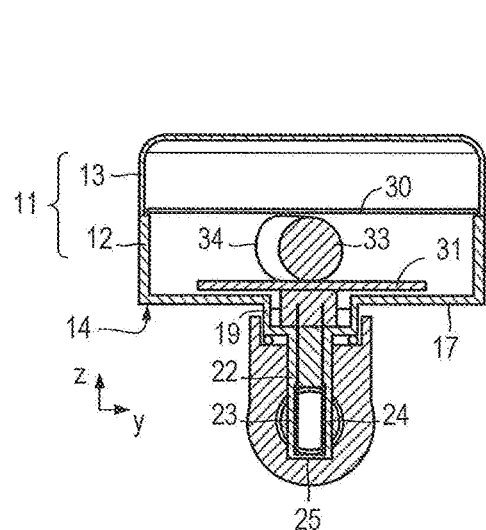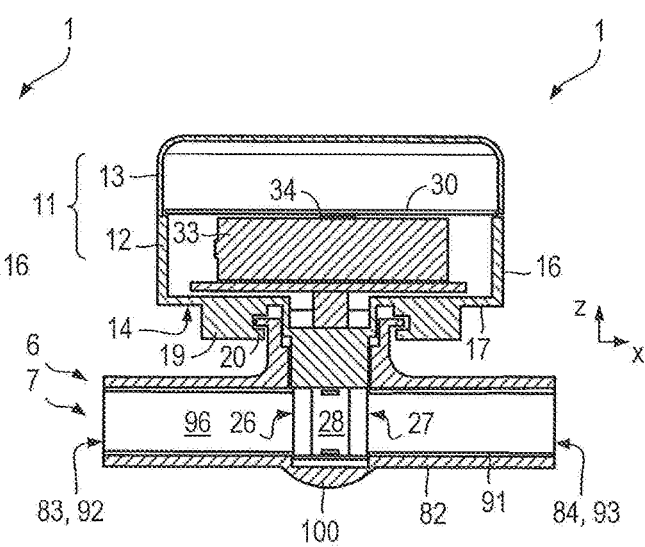
Fig. 2c          Fig. 2d

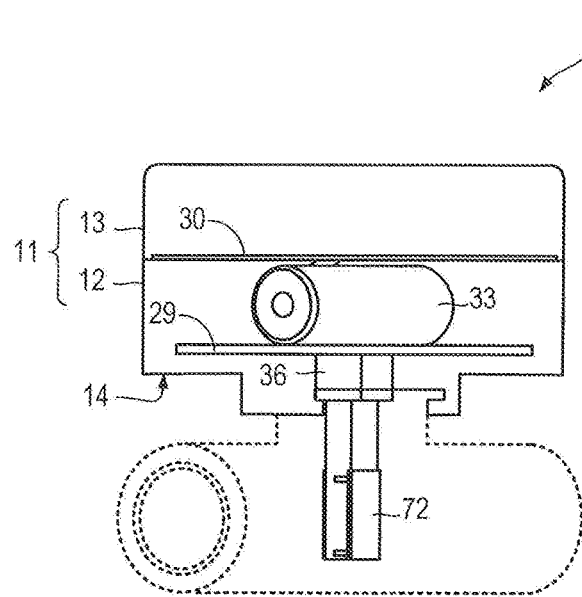
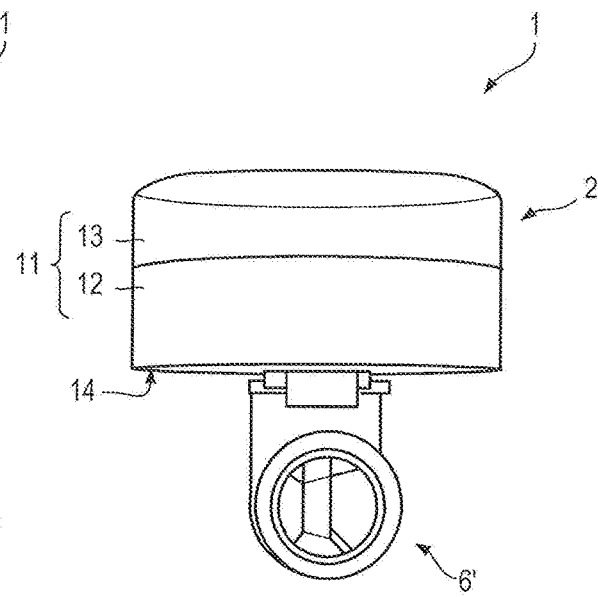
Fig. 3a　　　　　　　　　Fig. 3b
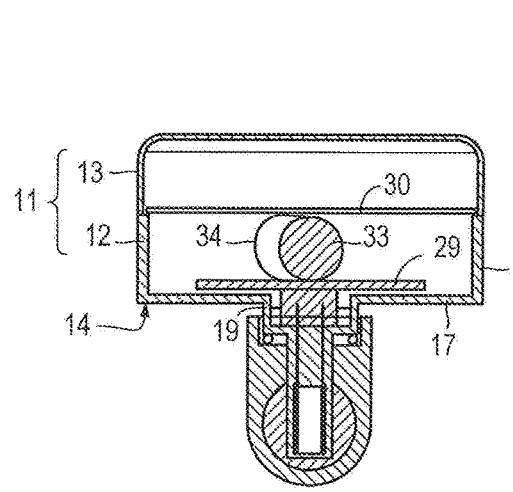
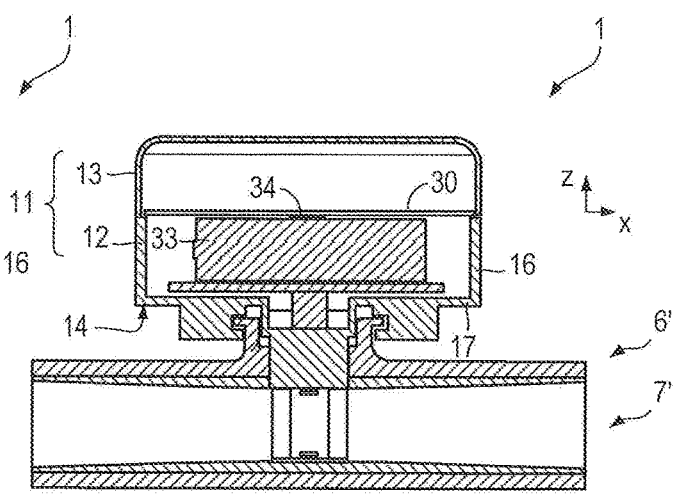
Fig. 3c　　　　　　　　　Fig. 3d

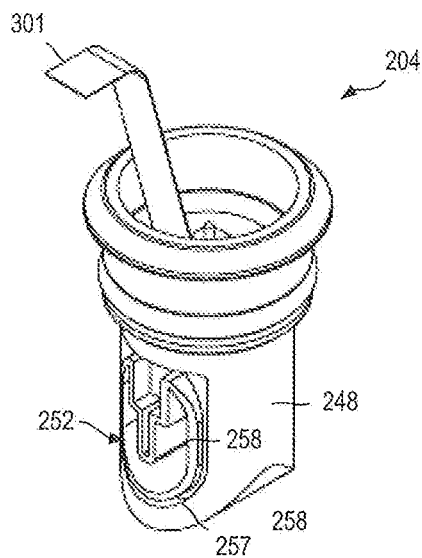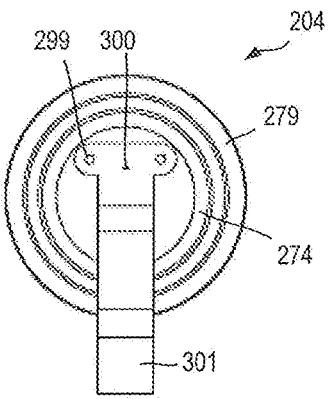
Fig. 15a    Fig. 15c
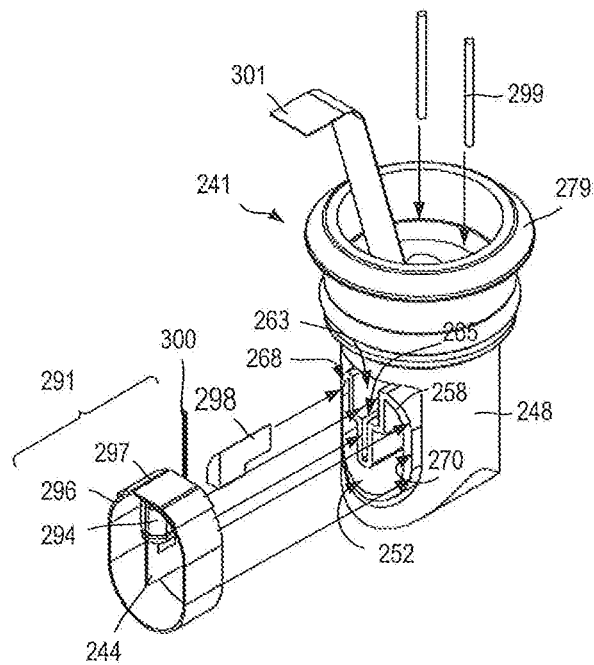
Fig. 15b

ELECTROMAGNETIC FLOW SENSOR

FIELD OF THE INVENTION

The present invention relates to an electromagnetic flow sensor, to a sub-assembly which comprises a register and the electromagnetic flow sensor, and to an electromagnetic flow meter assembly comprising the sub-assembly and a housing through which water (or other conductive fluid) can flow.

BACKGROUND

Battery-powered electromagnetic flow meters (which may also be referred to as "magnetic flow meters" or "mag meters") for residential water metering are known and examples include the iPERL (RTM) range of water meters available from Sensus Inc. Reference is also made to WO 00/19174 A1.

Existing electromagnetic flow meters can suffer one or more limitations.

First, many existing types of electromagnetic flow meter are not particularly suited to low-cost and/or high-volume manufacture. Typically, electromagnetic flow meters are needed in a range of different sizes for different sizes of pipes. However, many component parts of a typical electromagnetic flow meter, such as sensing electrodes, electromagnetic coils and the like, tend to depend on the size of the flow tube. Thus, a specific set of component parts is manufactured for each size of flow meter and each size of flow meter tends to have a different assembly line. This can increase manufacturing costs.

Secondly, existing types of electromagnetic flow meter tend to have electromagnetic coils which are arranged around the outside of a plastic flow pipe. Thus, these types of flow meter may be prone to damage since they often used in situations where pipes are misaligned and, thus, are subjected to stress during fitting and use. As a result of being formed from plastic and being connected to metal pipes (which are generally more resilient to stress), these types of flow meter may crack. Furthermore, the electromagnetic coils are located further away from the flow channel which will result in a weaker magnetic field than a closer coil, thereby reducing sensitivity, or require more power to compensate and so increase power consumption of the flow meter.

Thirdly, electromagnetic flow meters tend to be fitted in and around flow pipes. Thus, to discourage or prevent ingress of water from outside the flow meter into electrical parts of the flow meter (such as the coils and electrodes), the electrical parts are often encapsulated with a potting compound after the flow meter has been assembled.

SUMMARY

According to a first aspect of the present invention there is provided an electromagnetic flow sensor. The sensor comprises a body or frame, a passage through the body or frame, a part of a magnetic circuit supported by the body or frame for directing a magnetic field across the passage and at least first and second electrodes supported by the body or frame. The first and second electrodes are arranged to sense a voltage in response to a conductive fluid (such as water) flowing through the passage. At least a portion of the body or frame supporting the magnetic circuit part and the at least first and second electrodes are configured to be insertable into a flow tube (such as a pipe or other form of fluid housing) through a single aperture in the flow tube.

Thus, the flow sensor can be used in a variety of sizes of flow tubes. Moreover, the flow tube need not be made from insulating nor non-magnetic materials since the electrodes are disposed on an insulating substrate, and the magnetic field is applied to a space within the flow tube. Furthermore, the sensor can be easier to seal.

The frame may be included (e.g. housed) or attached to (e.g. depend from) a body. The body may be substantially cylindrical.

The magnetic circuit part may comprise first and second pole pieces disposed on opposite sides of the passage or portion of the passage. The magnetic circuit part may comprise first and second elements (e.g. sheets or pieces) of soft magnetic material.

The sensor may comprise first and second passages through the body or frame and first and second magnetic parts for directing respective magnetic fields across the first and second passages. The first and second magnetic parts may comprise a common magnetic part portion.

The passage may present a profile to the flow which turns back on itself and the magnetic circuit part comprises a first, central pole piece and a second pole piece extending around the first pole piece. For example, the profile may be 'U'-shaped, flat-sided oval, elliptical, circular or polygonal.

The sensor may further comprise an electromagnetic coil arranged to generate magnetic flux in the magnetic circuit. The sensor may further comprise at least one piece of semi-hard magnetic material passing through the coil and magnetically coupled to magnetic circuit part.

The body or frame may extend between first and second ends in a first direction and the passage crosses the body or frame in a second direction which is perpendicular to the first direction. The first and second electrodes may be spaced apart along a third direction which is perpendicular to the first and second directions. The sensor may further comprise an insulating barrier between first and second electrodes. The insulating barrier may be provided in a central protrusion into the flow.

The insulating barrier may extend in the second direction for at least a given distance. The given distance may be at least 5 mm or at least 10 mm. The insulating barrier may extend up to the diameter of the insertable part of the body or frame or a length of the insertable part of the body or frame distance in a direction along the longitudinal length of the flow tube.

The magnetic circuit parts may be electrically insulated, for example by means of an insulating coating.

The single aperture may have a diameter of between 10 mm and 15 mm.

The sensor may comprise a first part of a connector which comprises first and second complementary parts connecting the sensor to a fluid housing. The sensor may comprise a first mating surface for mating with a second, complementary mating surface for water-tightly sealing the sensor and fluid housing. The first mating surface may comprise a flat, annular surface. A seal such as a compressible washer or an 'O'-ring may be interposed between the first and second mating surfaces. The connector may be a bayonet connector. The connector may be a threaded connector. The connector may be a cylindrical, or slightly conical. The water-tight seal maybe formed by crimping or rolling a seal. The water-tight seal maybe formed by potting or adhesives. The connector may be a snap-fit connector or other form of one-time fit connector.

The magnetic circuit part and electrodes may be electrically insulated. The electrodes may be covered with an ion-permeable material, which may itself be either insulating or electrically conductive.

The sensor may comprise an insulating box around magnetic poles and electrodes.

The sensor may be integrated into a register which is retainable on a single aperture of the flow tube. The sensor may comprise a removable hose lock-type retention for mounting the register to the flow tube. The register may be usable with multiple flow tube diameters and is retainable in a central position of a flow sensitive area. The magnetic circuit may be arranged to generate magnetic field in two adjacent regions of the flow tube (e.g. fluid housing) in substantially opposite directions. The at least first and second electrodes may be formed on a planar substrate, such as printed circuit board. The electrodes may be electrochemical half cells, such as Ag/AgCl formed by anodising a silver surface. The magnetic circuit may comprise pole pieces made from soft magnetic stainless steel.

The sensor may further comprise a drive coil for generating the magnetic field. The sensor may further comprise one, two or more remanent magnetic elements passing through the drive coil.

The sensor may further comprise a magnetic field sensor positioned to measure the magnetic field in or next to the passage.

Active parts of the sensor may be insertable into the flow tube through the single aperture. The active parts may include pole pieces, coil, electrodes and, optionally, semi-hard magnetic material. The single aperture may be disposed on a top side of the flow tube.

The sensor may further comprise a magnetic screen arranged to screen at least the passage from an external magnetic field. The magnetic screen may be provided by, or integrated into, the flow tube. At least part of the magnetic circuit may serve as a magnetic screen. The at least part of the magnetic circuit may be outer pole pieces(s). The magnetic screen may comprise sufficient thickness of magnetic material to avoid saturation when a magnet of a strength specified by the Measuring Instruments Directive is placed against the meter. The electrodes may be formed on a planar substrate.

The sensor may comprise a central protrusion, which is electrically insulated, which includes a central magnetic pole. The central protrusion may include the first and second electrodes. The central protrusion extends across the full aperture along the direction of flow. This can help to minimise short circuiting of the electrodes by the surrounding water.

The body or frame may, in use, be in direct contact with the ionic fluid and electrically conductive parts except the at least first and second electrodes are electrically insulated from the water. The body or frame is preferably configured to provide smooth fluid-contacting outside surfaces.

The conductive fluid may be an ionic fluid. The conductive fluid may be water.

According to a second aspect of the present invention there is provided a sub-assembly comprising an electromagnetic flow sensor and a meter register. The electromagnetic flow sensor and the meter register form a single unit.

The magnetic circuit part and the electrodes may be integrally formed in the meter register.

The meter register may comprise an electronics module operationally connected to the flow sensor so as to process signals from the flow sensor. The electronics module may be configured to cause the flow sensor to generate the magnetic field. The meter register may further comprise a display. The sub-assembly may be battery-powered.

According to a third aspect of the present invention there is provided an electromagnetic flow meter comprising a tubular fluid housing having a fluid housing wall and a fluid housing aperture in the fluid housing wall, an optional conditioning tube(s) disposed within the fluid housing and having a water conditioning tube wall and a conditioning tube aperture in the conditioning tube wall and a sensor or a sub-assembly comprising a sensor, the sensor inserted in the tubular water housing so as to at least partially pass through the fluid housing aperture and to at least partially pass through the conditioning tube aperture. The conditioning tube(s) may include first and second conditioning tubes disposed upstream and downstream of the sensor respectively.

The sensor may be removably inserted in the tubular housing. The sensor, however, may be permanently mounted to the tubular housing.

The tubular housing may take the form of a T-piece pipe.

The tubular housing may have a DN size between DN 15 and DN 50 or more. The tubular housing may have nominal pipe size of between ⅝ and 2 inches or more.

The meter may be a whole-flow flow meter. The meter may be configured such that the whole flow passes through the insert. The meter may be configured such that the whole flow passes between portions of the insert.

A meter may be configured such that a continuous electrical ground connection from one end of the meter to the other, and to the water, is formed by the main meter body.

A new way of making a range of sizes of water meter can be provided, using a single register design that plugs into a range of different flow tubes, typically covering a range from DN15 to DN50. The register includes a flow insert that carries all the electrode connections and magnetic field generating and measuring components. To accommodate different flow tube sizes, the flow tubes themselves contain flow conditioning inserts that ensure that the flow matches the requirements of the sensor to achieve a wide turndown range with good accuracy.

According to a fourth aspect of the present invention there is provided a modular design of electromagnetic flow meter, in which a single register design with integrated electrodes and magnetic components is able to fit into a range of different flow tube diameters and lay lengths, covering a ratio of more than 3 between the smallest and largest tube diameters.

According to a fifth aspect of the present invention there is provided a whole-flow magnetic flow meter in which all electrode and magnetic connections are formed in a single sub-assembly and pass through a single aperture in the flow tube.

According to a sixth aspect of the present invention there is provided an insertion magnetic flow meter in which all the electrode and magnetic connections are formed in a single sub-assembly, with an insulating box around magnetic poles and electrodes.

In the flow meter, the magnetic poles and electrodes may be formed as an integral part of the meter register. The register may be retained on the single aperture of the flow tube. A removable hose lock type retention may be used to mount the register to the flow tube. A fixed or one-time retention may be used to mount the register to the flow tube. The same register can be used with multiple flow tube diameters, whilst retaining central positioning of the flow sensitive area.

The electrodes may be formed on a planar substrate, such as printed circuit board. The electrodes may be electrochemical half cells, such as Ag/AgCl formed by anodising a silver surface, or using other suitable materials formed in other ways. The magnetic circuit pole pieces may be made from soft magnetic stainless steel. The magnetic circuit pole pieces may be made from soft magnetic non-stainless steel having a protective coating. The magnetic field may be generated using a remanent magnetic element and a drive coil. The sub-assembly with electrodes and magnetics may also include a means to measure the field, such as a sense coil.

The magnetic circuit may generate magnetic field in two adjacent regions of the flow tube in substantially opposite directions.

According to a seventh aspect of the present invention there is provided a modular low power electromagnetic water meter in which a single sealed register design can be used with a range of flow tube sizes covering around one decade of maximum flow rates. It uses an insertion flow meter construction, planar electrodes, and flow conditioning parts to achieve this.

BRIEF DESCRIPTION OF THE DRAWINGS

Certain embodiments of the present invention will now be described, by way of example, with reference to the accompanying drawings, in which:

FIG. 2a is a schematic slightly-off side view of a flow meter sub-assembly inserted in a DN15 flow tube;

FIG. 2b is a schematic slightly-off end view of a flow meter sub-assembly inserted in a DN15 flow tube;

FIG. 2c is a transverse cross-sectional view of a flow meter sub-assembly inserted in a DN15 flow tube;

FIG. 2d is a longitudinal cross-sectional view of a flow meter sub-assembly inserted in a DN15 flow tube;

FIG. 3a is a schematic slightly-off side view of a flow meter sub-assembly inserted in a DN20 flow tube;

FIG. 3b is a schematic slightly-off end view of a flow meter sub-assembly inserted in a DN20 flow tube;

FIG. 3c is a transverse cross-sectional view of a flow meter sub-assembly inserted in a DN20 flow tube;

FIG. 3d is a longitudinal cross-sectional view of a flow meter sub-assembly inserted in a DN20 flow tube;

FIG. 15a is perspective view of the insert shown in FIG. 14;

FIG. 15b is an exploded perspective view of the insert shown in FIG. 14;

FIG. 15c is a top plan view of the insert shown in FIG. 14;

DETAILED DESCRIPTION OF CERTAIN EMBODIMENTS

Flow Meter Assembly 1

Figure 1:
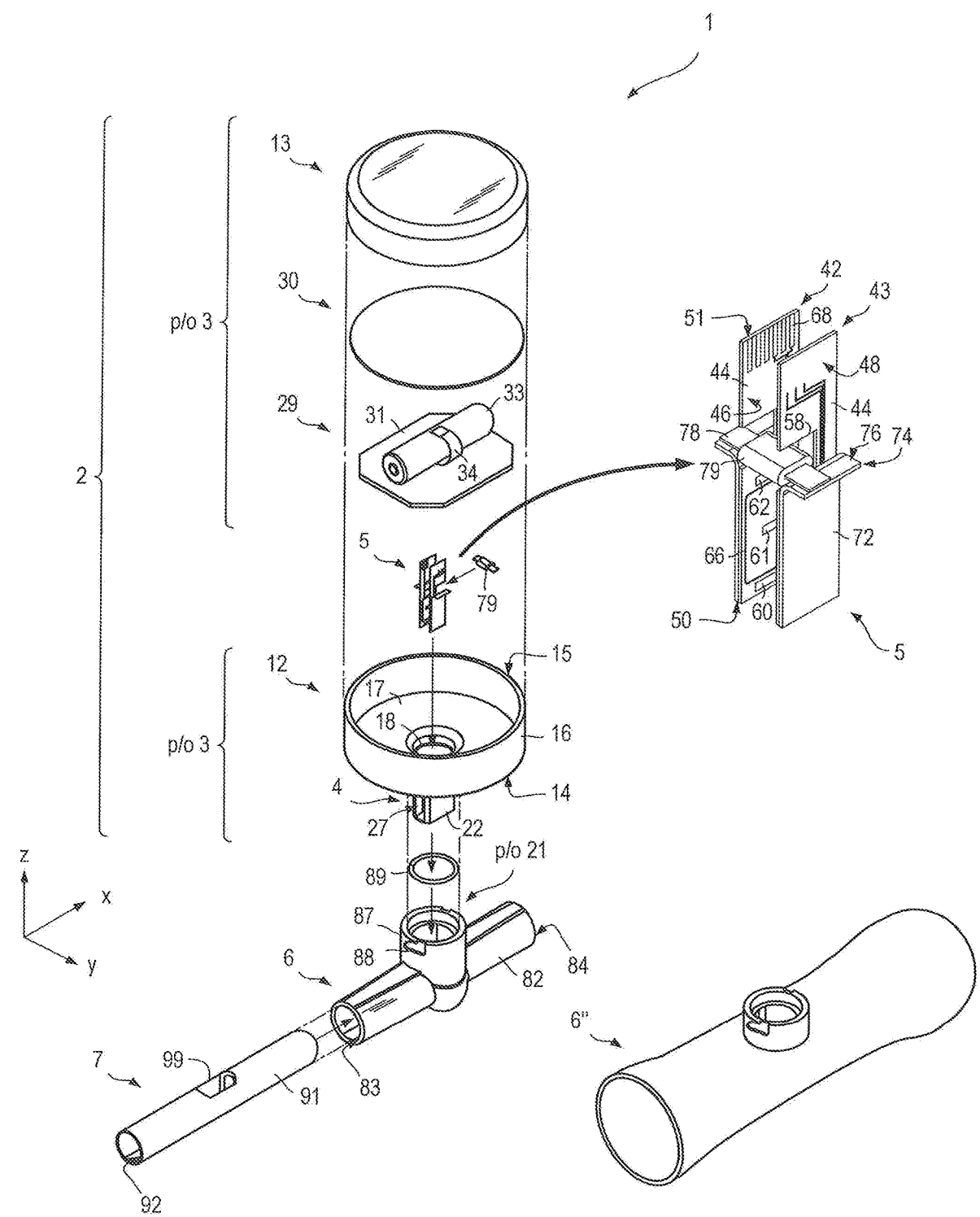
FIG. 1 is an exploded perspective view of a flow meter assembly comprising a flow meter sub-assembly having an integrated flow measurement element which is removably insertable into a flow tube and which is capable of fitting a range of different flow tube diameters.

Referring to FIGS. 1 and 2a to 2d, a first flow meter assembly 1 (herein referred to simply as a "flow meter") in accordance with the present invention is shown.

The flow meter 1 can be used for water metering using battery-powered electromagnetic sensing for residential commercial and industrial purposes. In particular, the flow meter 1 can be used as a battery-powered fiscal water meter meeting recognised international standards for water metering accuracy.

The first flow meter assembly 1 includes a flow meter sub-assembly 2 (herein also referred to as a "flow meter unit") which comprises a register 3 having an integrated insert 4 (or "plug") which comprises a flow measuring element 5 (herein also referred to as a "flow measurement element", "flow sensor" or simply "sensor") providing an electromagnetic flow sensor which is removably insertable into a generally tubular fluid housing 6 having an inner conditioning tube 7. The fluid may be water or other form of conductive fluid.

The water housing 6 can have a nominal diameter of 20 mm, that is, it is a DN20 fitting (or the equivalent or corresponding NPS or American Standard sizes). However, as will be explained in more detail hereinafter, the plug 4 can be inserted into different sizes of tubular water housing 6, for example, DN15, DN50 and so on, so as to provide different sizes of flow meter (in other words, so as to provide water meters which can be used with different sizes of pipes).

Flow Meter Sub-Assembly 2

Register 3

Referring still to FIGS. 1 and 2a to 2d, the flow meter sub-assembly 2 includes a housing 11 for the register 3 which comprises a shallow plastic or metal cylindrical can 12 and a shallow transparent cap 13 (herein referred to as a "window"). The housing 11 has a diameter, d, of approximately 75 mm.

The register can 12 has a bottom edge 14 and a top edge 15 (herein also referred to as the "top rim"), a side wall 16 running between the bottom and top edges 14, 15, a bottom end wall 17 having a central aperture 18. A collar 19, which is coaxial with the aperture 18, depends from the bottom end wall 17 and has inwardly projecting pins 20 providing a male part of a bayonet connector 21. A depending 'U'-shaped plug 22 (or "insert"), also aligned with the aperture 18, depends from the bottom end wall 17. The plug 22 comprises first and second parallel plates 23, 24 (or "side walls") connected by a bottom cross piece 25 thereby defining first and second open faces 26, 27 and a passage 28 between the faces 26, 27.

Referring still to FIGS. 1 and 2a to 2d, the flow meter sub-assembly 2 includes a drive electronics module 29 (herein also referred to simply as the "electronics") and a display 30 which sits in the register can 12 under the window 13. The drive electronics module 29 includes a register printed circuit board (PCB) 31 which supports drive electronics components (not shown) and a AA battery 33 which is held in place by spring clip 34. The register can 12 is filled with potting compound (not shown). The measuring element 5 is insertably connected to a connector 36 on the underside of the register PCB 31 and encapsulated using, for example, the potting compound.

The electronics module 29 is maintained in a dry environment using standard methods, such as, for example, potting, using a glass-metal construction, low water permeability plastics, desiccant and the like.

Measuring Element 5

Figure 4:
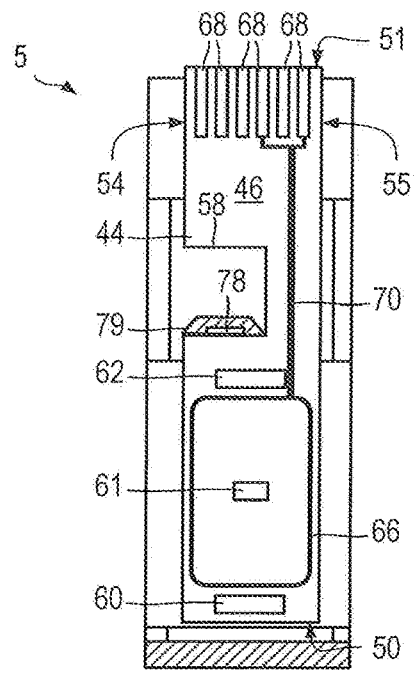
FIG. 4 is a side view of a flow measurement element comprising a printed circuit board, electrodes, a magnetic circuit, a sense coil and an auxiliary ground electrode.
Figure 5:
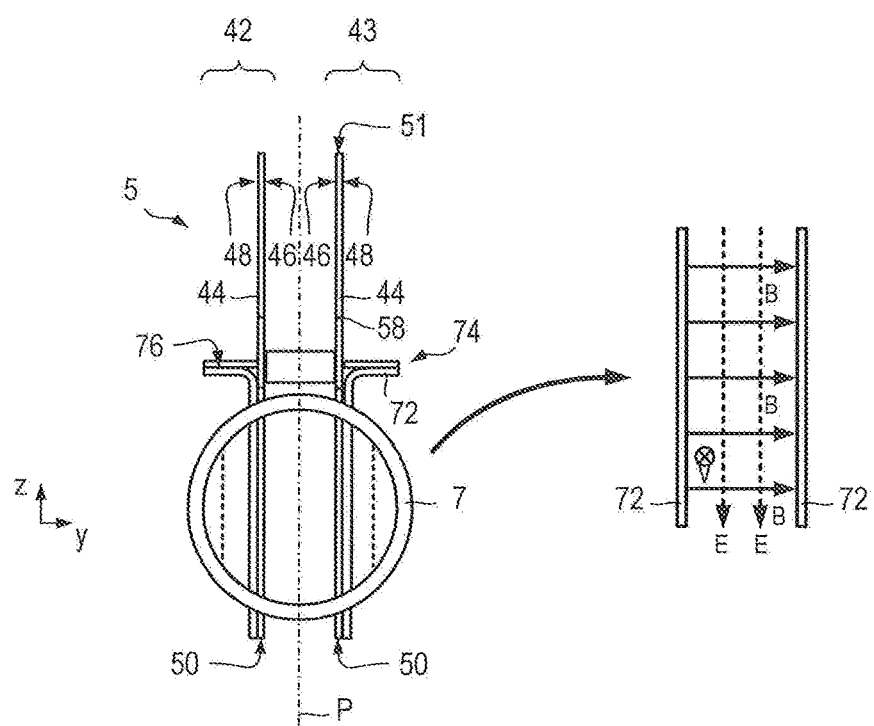
FIG. 5 is a cross-section view of a flow measurement element inserted in a DN15 flow tube and illustrates magnetic field lines and induced electric field resulting from a flow of water through the flow tube.

Referring still to FIGS. 1 and 2a to 2d and referring also to FIGS. 4 and 5, the measuring element 5 takes the form of an insertion electromagnetic flow sensor.

The measuring element 5 includes first and second flat, rectangular plate-like parts 42, 43 facing each other in symmetric arrangement, i.e. symmetric about a central plane P. Each part 42, 43 comprises a planar PCB 44 having a first face 46 ("inward face") and second face 48 ("outward face") running between first and second ends 50, 51 ("lower and upper ends") and between first and second edges 54, 55 ("forward and rear edges"). About two-thirds of the way between the lower and upper ends 50, 51, each PCB 44 has a slot 58 running from the forward edge 54 towards, but not reaching, the rear edge 55.

Each PCB 44 supports first, second and third rectangular electrodes 60, 61, 62 on a lower portion of its inward face 46. The electrodes 60, 61, 62 are spaced apart between the lower end 50 and the slot 58. The second electrode 61 is interposed between the first and third electrodes 60, 62 and provides a ground electrode.

The electrodes 60, 61, 62 are preferably anodised silver/silver chloride (Ag/AgCl) half-cell electrodes formed on the inwardly-facing surface 46 of the circuit board 44 using standard plating and etching processes. The electrodes 60, 61, 62 may be protected by an ion-permeable coating, such a Nation, or other porous materials, which may be conductive, such as graphite, or insulating such as ceramic or porous plastic. They may also be formed from conductive, inert materials including graphite, conductive plastic, or inert metals.

Multiple electrodes can be used, for example, to improve the flow measurement performance, to act as reference or bias electrodes and/or to detect when the sensor is full of water or not. In the illustrated embodiment, a single ground electrode 61 is used, which can be employed to bias electronics for the electrode inputs so that they are within an acceptable common mode input range.

Each PCB 44 also supports a sense coil 66 on the lower portion of its inward face 46, which is used to measure the magnetic field B. The sense coil 66 may comprise one or more loops which is connected to a set of connectors 68 at the upper end 51 of the sensor PCB 44 via conductive tracks 70.

Each PCB 44 supports a respective electrically-insulated pole piece 72 on the lower portion of its outward face 48. The pole pieces 72 are insulated, for example by painting, coating or encapsulating the pole pieces 72 with an insulating material (not shown) or by placing the pole pieces 72 such that surrounding plastic parts separate the pole pieces 72 away or keeps them sufficiently far from the water flow so that the pole pieces 72 do not short out induced emf. In use, the electrically-insulated poles pieces 72 are wetted. Each pole piece 72 takes the form of a sheet, for example strip, or piece, for example a block or bar, of soft magnetic material, such as a high permeability electrical stainless steel, for example 430FR, which runs from the lower end 50 of the PCB 44 towards the upper end 51. When the pole piece 72 reaches the slot 58, it bends outwardly to form a narrow wing 74 (or "ledge").

The upper face 76 of the wing 74 supports one or more sheets, for example strips, or pieces 78 of remanent magnetic material. The remanent magnetic material is a semi-hard magnetic material, such as Vacuumschmelze SENSOR-VAC®, Hitachi ZMG423 or MagneDur 20-4. The one or more remanent magnetic parts 78 pass through a drive coil 79 and bridge the two PCBs 44 pole pieces 72.

The pole pieces 72 are preferably made from permeable stainless steel, although other suitable soft magnetic materials may be used. This arrangement can avoid the need to pass magnetic flux through a pressure-withstanding flow tube wall. This can help to improve efficiency of field generation across the water for a given magnetic drive power. This can allow lower power consumption for a given flow sensitivity. This can also allow a wider variety of materials to be used to construct the flow tube wall.

The magnetic field is preferably generated using the remanent magnetic element 78 operating at low frequency, such as 1 Hz, to help reduce or minimise power consumption and thus allow the sensors to be powered using a battery 33.

The pole pieces 72 may be mounted on the measurement insert or insert-moulded into the flow tube 6.

Tubular Water Housing 6

Referring still to FIGS. 1 and 2a to 2d, the tubular water housing 6 comprises a pipe wall 82 which runs between first and second open ends 83, 84 and provides a tubular space 85. The housing 6 also includes an opening 86 disposed midway between the first and second ends 83, 84 which is provided with a short, annular collar 87 upstanding from the pipe wall 82 and which has a pair of 'L'-shaped slots 88 recessed into the outer wall of the collar 87 on opposite sides of the collar 87 providing a female part of the bayonet connector 21.

The flow meter sub-assembly 2 and the tubular water housing 6 are connected by the bayonet connector 21. A seal

89, such as an 'O'-ring, sits on an annular shelf 90 within the collar 87 and helps to provide a water-tight seal and so help to discourage or prevent water from escaping from the housing 6.

The tubular housing 6 may be fabricated from a wide range of materials including metals and plastics. The metals may be non-ferrous, such as bronze or brass, or magnetic materials such as ductile iron, and may be coated with a suitable waterproof coating such as epoxy or powder coating to prevent corrosion. The tubular housing 6 may be disposed within a tubular magnetic shield (not shown). The shield (not shown) may be formed from mild steel or other suitable material. The shield (not shown) may have plastic coating(s) (not shown), for example, for cosmetic appearance and/or for electrical insulation.

Conditioning Tube 7

Figure 6A:
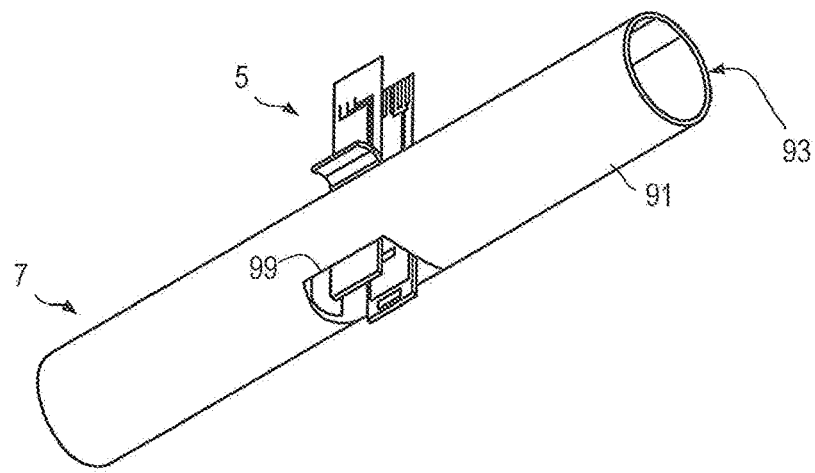
FIG. 6a is a perspective view of a flow measurement element with DN15 flow conditioner.
Figure 6B:
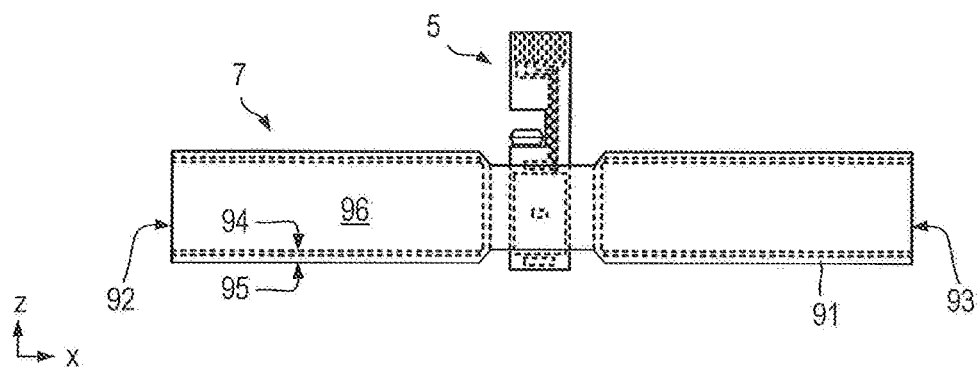
FIG. 6b is a side view of a flow measurement element with DN15 flow conditioner.
Figure 7:
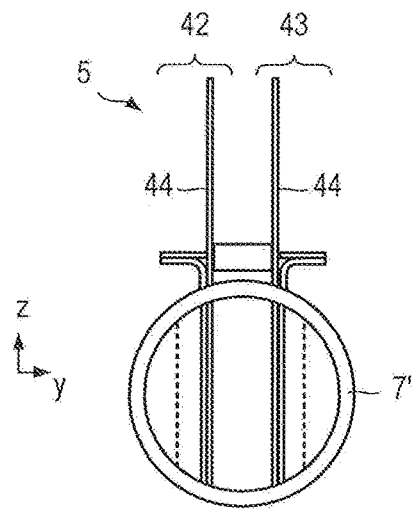
FIG. 7 is an end view of a flow measurement element in a DN20 flow tube.

Referring still to FIGS. 1 and 2a to 2d and also to FIGS. 6a and 6b, the conditioning tube 7 comprises a tube wall 91 which runs between first and second open ends 92, 93 and has an inner and outer wall surfaces 94, 95. The inner wall surface 94 provides a flow passage 96. The profile of the passage 96 generally narrows from the first end 92 of the tube 7 towards the middle 97, serving to accelerate the water velocity through the sensor, typically by a factor of 2 to 3, and hence increase the signal generates between the electrodes for a given volumetric flow rate. The profile of the passage 96 in transverse cross sectional profile can also change from being circular or elliptical to being rectangular to match the dimensions of the flow measuring element.

In the middle 97 of the tube 7, the tube wall 91 includes a longitudinally-orientated slot 98. The slot 98 has a profile and is dimensioned so as to receive the plug 22 and, thus, insert the flow measuring element 5 into the flow passage 96. The tube wall 91 may include another slot 99 on the opposite side of the tube 7 so as to allow a distal end of the plug 22 to pass back out of the tube.

Different Meter Sizes

A single insertion element 4 is able to be used for a range of flow tube sizes, i.e. a range of sizes of water housing.

Referring in particular to FIGS. 2a to 2d and 5, for the smallest size of housing 6, in this case DN15, the sensor element 4 is slightly oversized for the dimensions of the flow tube. This is accommodated by a bulge 100 (best shown in FIG. 2d) in the outer housing 6 so that the sensor 4 is symmetrically located.

Referring also to FIGS. 6a and 6b, the only path for water through the meter is through the sensor element 4 and the flow-conditioning plastic inserts 7 are used to accelerate and decelerate the flow upstream and downstream to minimise non-recoverable head loss.

Referring in particular to FIGS. 3a to 3d and 7, a DN20 meter follows a similar pattern, but in this case the sensing element 4 fits exactly to the bottom of the flow tube. In this case, the housing 6' is a sized for connection to DN20 fittings.

Figure 8A:
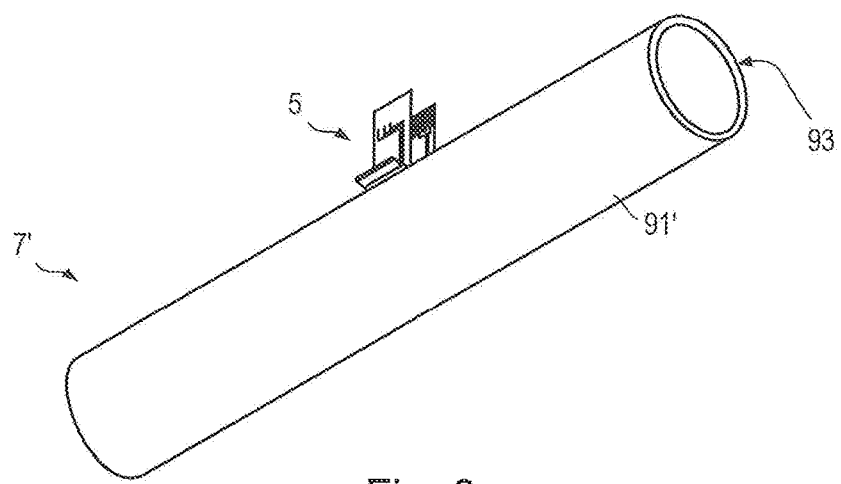
FIG. 8a is a perspective view of a flow measurement element with DN20 flow conditioner.
Figure 8B:
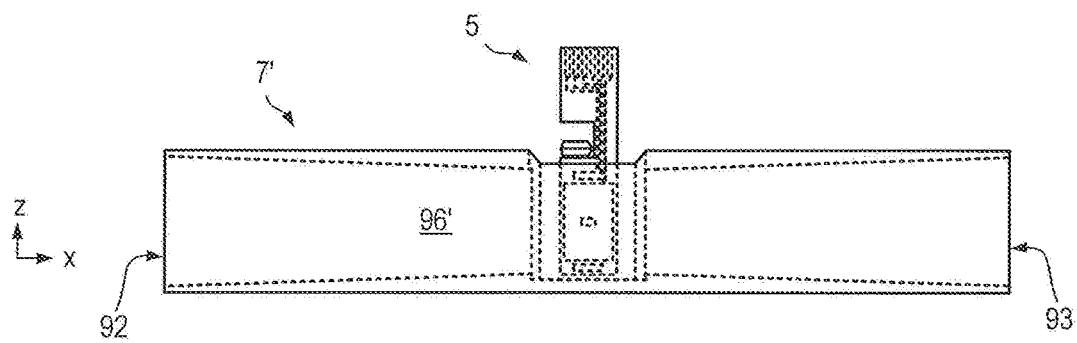
FIG. 8b is a side view of a flow measurement element with DN20 flow conditioner.

Referring to FIGS. 8a and 8b, flow conditioning plastic parts T control the transition from a circular to an accelerated rectangular region and back to circular again.

In both the DN15 and DN20 meters, the rectangular section conditioning tube 7, 7" can provide almost total independence of sensitivity from flow profile, efficient generation of magnetic field, large signal generation because of the aspect ratio and large signal generation because the flow speed is accelerated relative to the circular path by between two and three times.

Larger sizes of meters require a different approach since it is not possible to pass the full flow volume of, for example a DN50 meter, through the small aperture of the insertion flow sensor.

Figure 9:
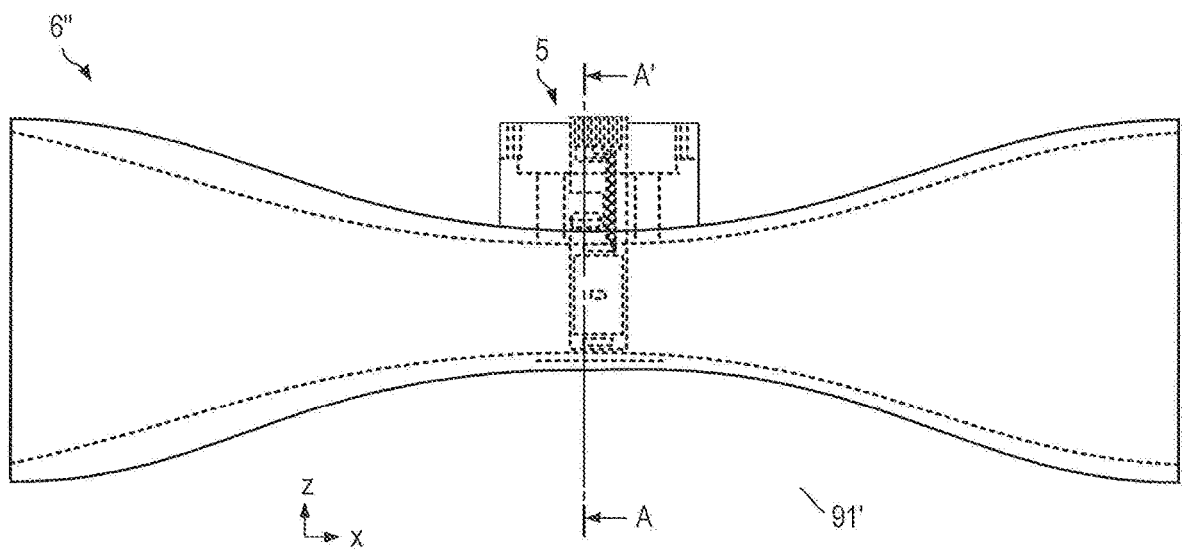
FIG. 9 is a side view of a flow measurement element and DN50 flow conditioner.
Figure 10:
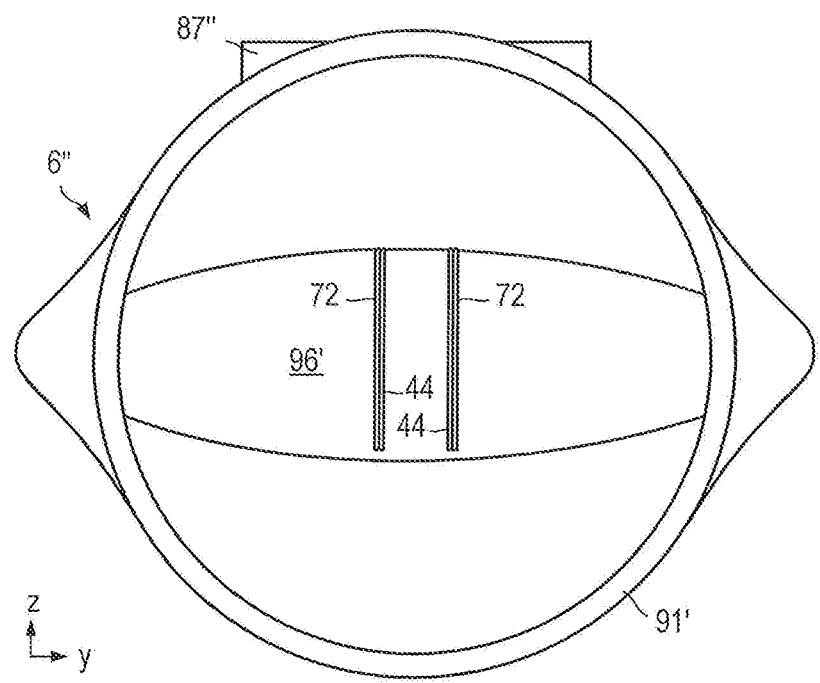
FIG. 10 is an end view of a DN50 conditioning tube showing profile change from a round inlet and central location of flow measurement element.
Figure 11:
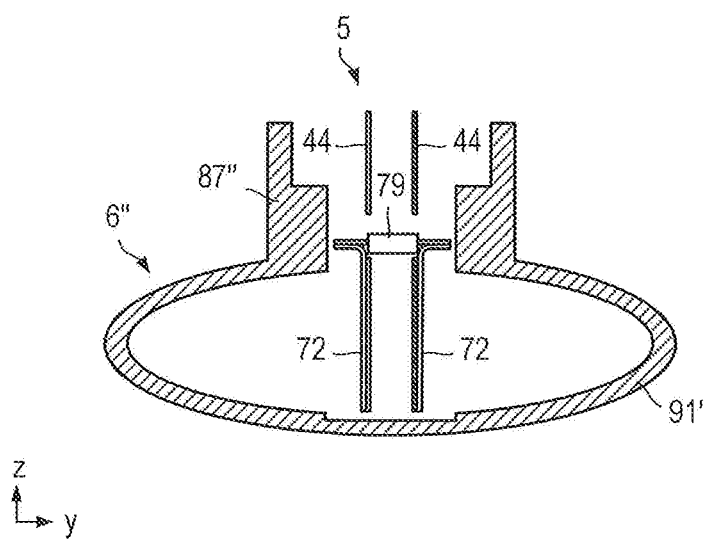
FIG. 11 is a cross section through the DN50 flow tube taken along the line A-A' in FIG. 9 showing mounting of a flow measurement element in the flow tube.

Referring to FIGS. 9, 10 and 11, an arrangement by which this may be achieved is shown. The flow conditioning elements are arranged such that the insertion element 4 aperture remains central in the reduced aperture flow area so that flow profile effects, such as elbows and valves, have a minimal effect of accuracy. The flow conditioning parts 7" are configured to maintain good flow profile immunity in these larger sizes. The signal-to-noise ratio of a larger-diameter meter should match that of the smaller sizes, if the flow conditioning elements are arranged to provide the same velocity acceleration as in the smaller sizes, whilst the power requirements to generate the magnetic field are the same as for the smaller diameter meters.

Second Flow Measuring Element 104

Figure 12:
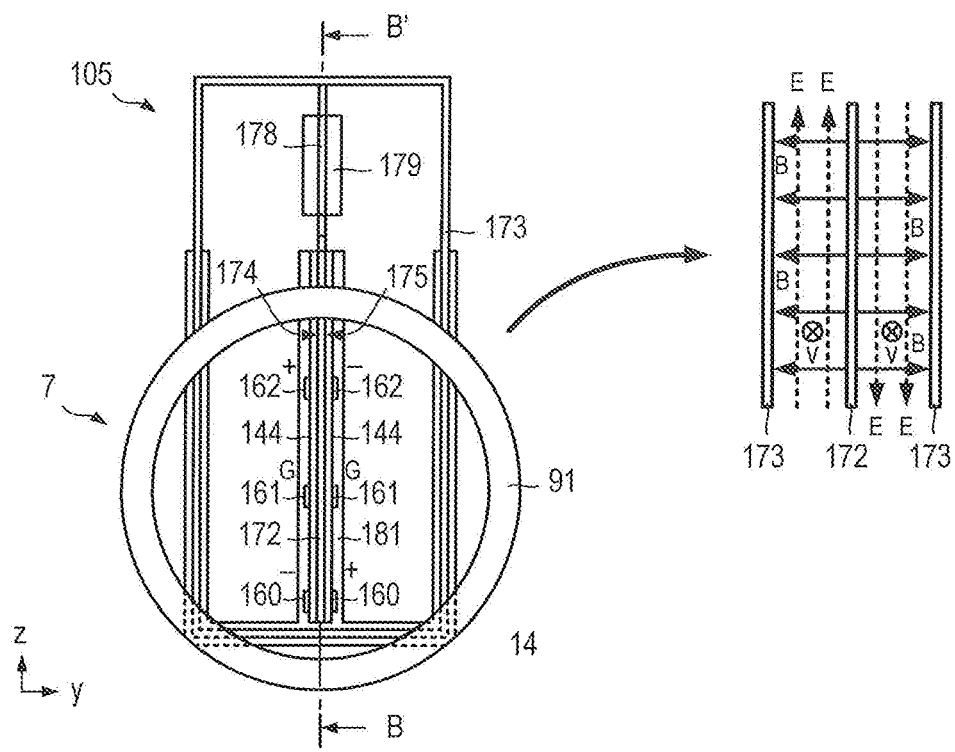
FIG. 12 is an end view of an insertion flow measurement element in a flow tube with printed circuit board electrodes, magnetic circuit, sense coil and auxiliary ground electrode and illustrates magnetic field lines and induced electric field resulting from a flow of water through the flow tube.
Figure 13:
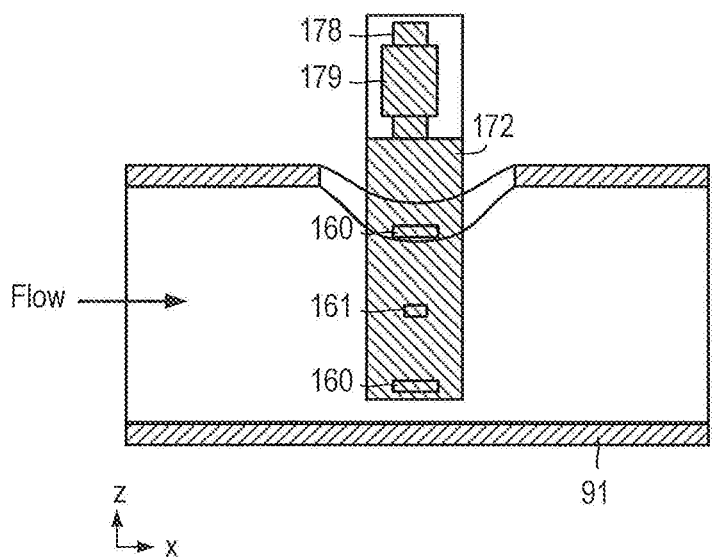
FIG. 13 is a side view of an insertion flow element in a flow tube.

Referring to FIGS. 12 and 13, a second measuring element 104 is shown. The second flow measuring element 104 is similar to the first measuring element 5 (FIG. 1) hereinbefore described and can be used as the measuring element in the flow meter assembly 1 (FIG. 1) hereinbefore described.

The second flow measuring element 104 differs in that first and second PCBs 144 sandwich a central element, for example in the form of a strip, of soft magnetic material 172 having first and second opposite sides 174, 175.

Each circuit board 144 has at least two electrodes 160, 161, 162 for measuring a differential signal caused when water flows through the sensor. In the most common configuration, the electrodes 160, 161, 162 are connected in an anti-parallel configuration since the direction of the induced electric field E with flow is opposite on the two sides of the sensor 104. This creates a balanced system with respect to uniform external fields.

The magnetic circuit consists of an electrically-insulated generally rectangular outer section of soft magnetic material 173 and the central planar pole piece 172 which is sandwiched between the two circuit boards 144. These parts are preferably permeable stainless steel, coated with an insulating material such as PTFE, powder coat, epoxy, paint, varnish, or polymer.

The field generating element 178 is located between the outer box 173 and central element 172. One or more remanent elements 178, which can take the form or a strip, bar or other part with a suitable geometry, pass through the coil 179.

The flow conditioning elements should be insulating and mate closely with the outer magnetic circuit part 173 in order to avoid shorting out the electrode signal through additional paths through the water or where a conductive flow tube, e.g. conductive water housing, is used. The flow conditioning elements require an additional insulating plane in line with the central magnetic element 172 in order to avoid shorting out the signal around the sides of the circuit boards 144.

There are multiple measurement electrodes 160, 161, 162 on the insertion element. The electrodes 160, 161, 162 on the two PCBs 144 can either be connected in anti-parallel subject to geometry, connected in series if the axial extents of the insulators and conditioning elements are long enough, or they may simply be connected to additional differential electrode inputs in the electronics. This latter arrangement provides a means to manage severe non-uniformity of flow profile, by allowing arbitrary combinations of signals from multiple sets of distributed electrodes to be combined together in software to synthesize a flow-profile immune sensor.

The exact position of the electrodes 160, 161, 162 on the circuit boards 144 may be altered to tune the response of the design to laminar versus turbulent flow, to minimise any change in sensitivity versus flow rate.

The second measuring element 104 can provide improved immunity to external magnetic fields. An additional external magnetic shield (not shown) can be omitted, if immunity to external fields is required by law (such as the EU Measuring Instruments Directive), regulatory authority, manufacturer, utility company or other relevant party. This is because the outer box 173 can serve as a magnetic shield.

Flow Meter Assembly 201

Figure 14:
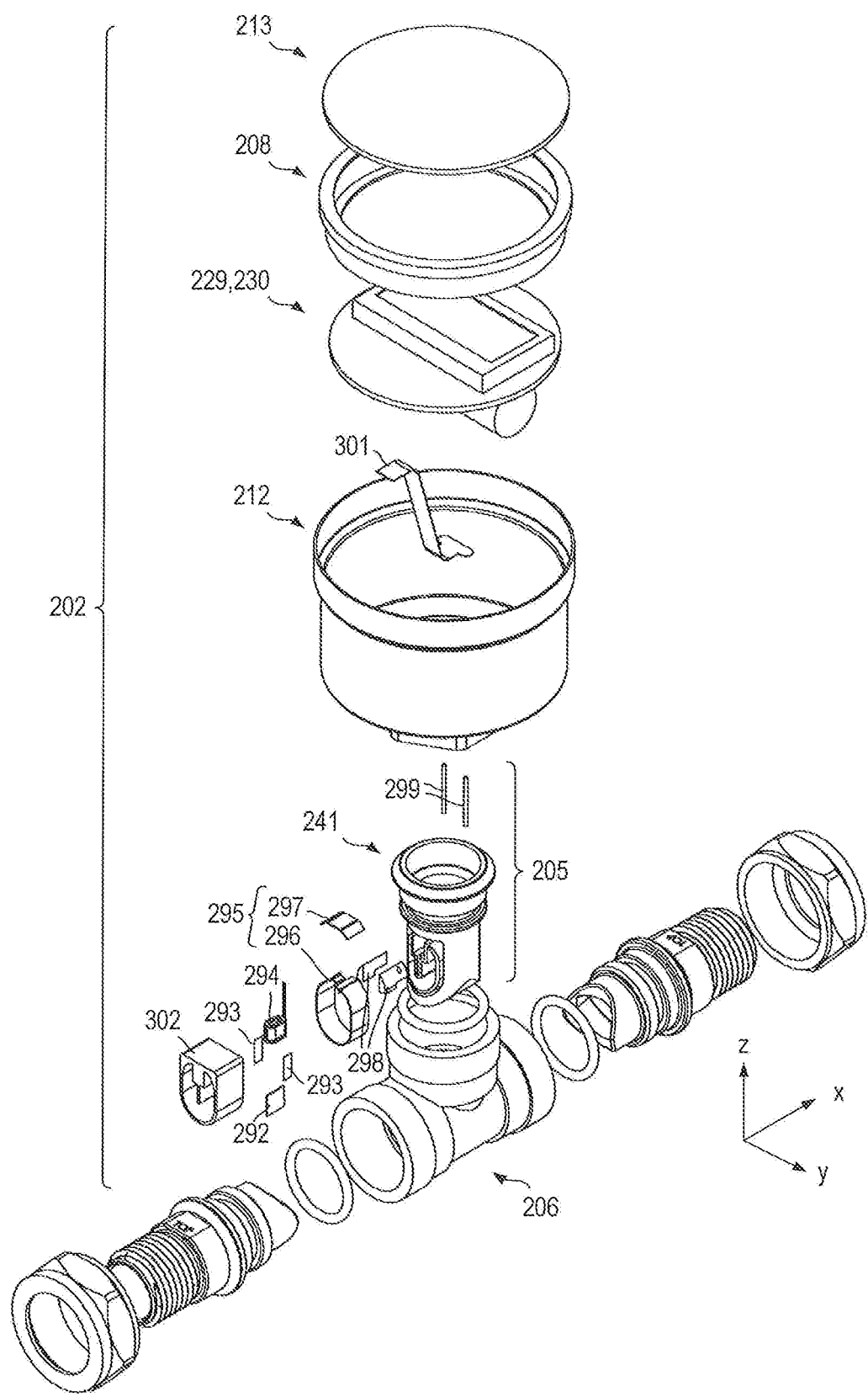
FIG. 14 is an exploded perspective view of another flow meter assembly comprising a flow meter sub-assembly having an insert which houses a flow measurement element which is removably insertable into a flow tube and which is capable of fitting a range of different flow tube diameters.
Figure 15D:
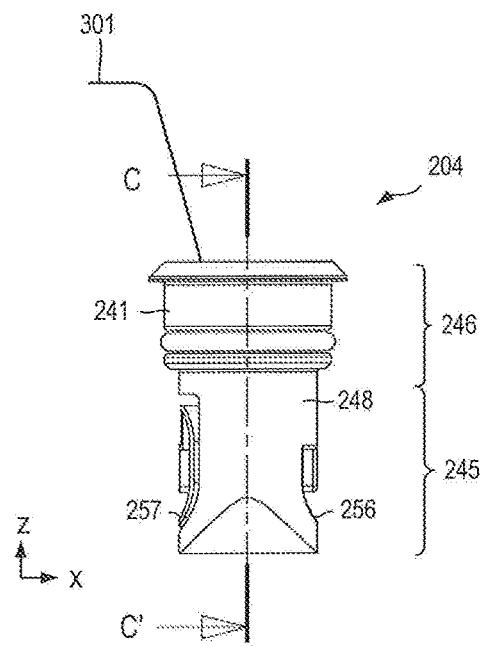
FIG. 15d is a side elevational view of the insert shown in FIG. 14.
Figure 15E:
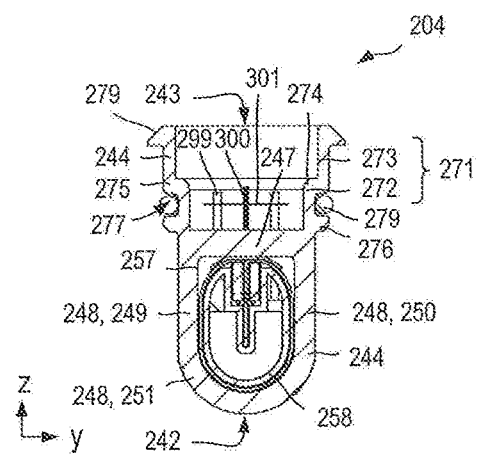
FIG. 15e is cross section of the insert shown in FIG. 15d taken along the line C-C'.
Figure 15F:
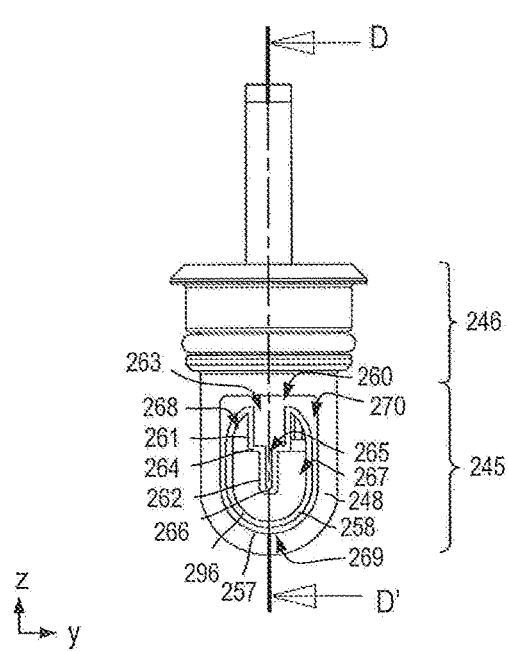
FIG. 15f is a front elevational view of the insert shown in FIG. 14.
Figure 15G:
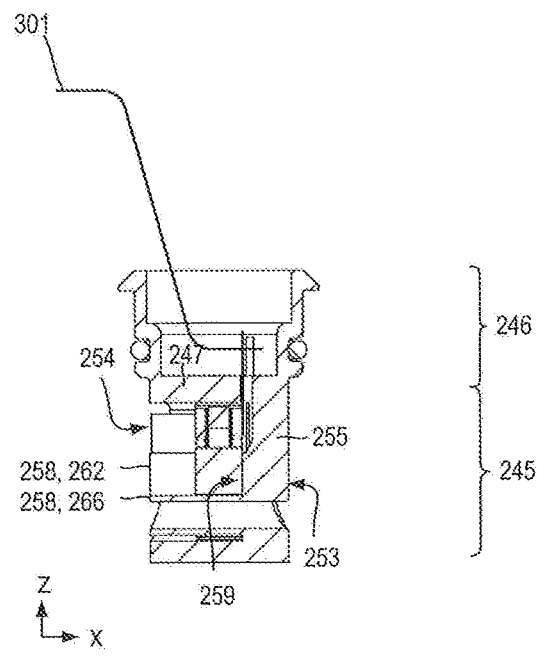
FIG. 15g is cross section of the insert shown in FIG. 15f taken along the line D-D'.

Referring to FIG. 14, a second flow meter assembly 201 (herein referred to simply as a "flow meter") in accordance with the present invention is shown.

The second flow meter assembly 201 includes a flow meter sub-assembly 202 which comprises a register 203 having an integrated insert 204 (or "plug") which comprises a flow measuring element 205 (herein also referred to as a "flow measurement element", "flow sensor" or simply "sensor") providing an electromagnetic flow sensor which is removably insertable into a generally tubular water housing 206 having an inner conditioning tube (not shown).

The second flow meter assembly 201 is similar to the first flow meter assembly 1 (FIG. 1). The second flow meter assembly 201 differs mainly in the configuration of the flow measuring element 205.

Flow Meter Sub-Assembly 202

Register 203

Referring still to FIG. 14, the register 203 is similar to the register 3 (FIG. 1) hereinbefore described. The register 203 includes a housing which comprises a metal cylindrical can 212 and a flat transparent window 213 provided with a perimeter window seal 208. The housing 211 has a diameter, d, of approximately 75 mm.

The housing 211 contains drive electronics 229 and a display 230 which are substantially the same or similar to those hereinbefore described and so will not be described again here in detail.

Insert 204 and Measuring Element 205

As mentioned earlier, the second flow meter assembly 201 differs mainly from the first flow meter assembly 1 (FIG. 1) in the configuration of the flow measuring element 205.

In the first flow meter assembly 1 (FIG. 1), the first flow measuring element 5 (FIG. 1) comprised flat, rectangular plate-like sensor parts 42, 43 (FIG. 1) which define a channel between the sensor parts 42, 43 (FIG. 1) which presents a vertically-orientated, rectangular profile to the flow of water.

The second flow measuring element 5 (FIG. 12) comprises two channels, each which presents a vertically-orientated, rectangular profile to the flow of water. Thus, each half can be thought of as a separate rectangular cell. The electronics could treat each half separately or join the electrodes together in series.

In the second flow meter assembly 201, the third flow measuring element 205 defines a channel which presents a 'U'-shaped profile to the flow of water, as will now be described in more detail.

Referring also to FIGS. 15a to 15g, the insert 204 comprises a body 241 which is generally cylindrical in shape and symmetrical about a central, vertical plane (not shown). The insert body 241 has first and second ends 242, 243 (herein referred to as the "bottom" and "top" of the body respectively) and outer walls 244 running between the bottom 242 and top 243 of the insert.

The insert body 204 comprises lower and upper portions 245, 246 divided by an internal floor 247.

The lower body portion 245 of the insert body 204 comprises a generally 'U'-shaped wall 248 comprising first and second flat side wall portions 249, 250 and a curved bottom wall portion 251. The wall 248 extends between first and second ends 253, 254 (herein referred to as "front" and "back" respectively). The wall 248 defines a cavity 252 (herein also referred to as "flow passage" or simply "passage"). The lower body portion 245 includes front curtain-like wall 255 which extends approximately half way between the floor 247 and the bottom 244.

The 'U'-shaped wall 248 and the curtain-like wall 255 define first and second apertures 256, 257 having an inverted arch window profile. Due to the curtain-like wall 255, the first aperture 256 is less tall than then second aperture 257.

A generally flat-sided, oval-shaped biscuit cutter-like frame 258 (herein also referred to as a "former") projects from an inner face 259 of the curtain-like wall 255 through the cavity 252. At the top 260 of the frame 258, the frame 258 drops with two sets of vertical walls 261, 262 forming a wider upper channel 263 having ledges 264 and a narrower lower channel 265 having a bottom 266, thereby forming a 'U'-shaped lower channel portion 267 and two, upper generally triangle-shaped channel portions 268. The dropped portion of the frame 258 (i.e. the walls 261, 262, ledges 264 and bottom 266) form a central protrusion which provides an insulating barrier. The bottom of the frame 258 drops below the lower edge of the wall 255 close to the bottom 269 of the cavity 252.

A generally annular space 270 is defined between the inside of the body wall 248 and the outside of the frame 258.

The upper body portion 246 of the insert body 204 includes annular wall 271 divided into lower and upper annular wall sections 272, 273. The lower wall section 272 has smaller inner and outer diameters than the upper wall section 273 thereby defining inner and outer steps 274, 275 in the wall 271. The lower wall section 272 includes a radially outwardly-projecting annular rib 276 which runs around the outside of the lower wall section 262 along its bottom edge. The outer step 275 and rib 276 define an annular groove 277 which can accommodate an 'O'-ring 278. The upper annular wall section 273 is provided with a radially outwardly-projecting lip 279 having an inclined upper edge 280 and flat lower edge 281 thereby defining a barbed profile.

Referring still to FIGS. 14 and 15a to 15g, the measuring element 205 is assembled within the body 241 of the insert 204, in particular, around the frame 258.

The insert 204 includes a magnetic circuit 291 which includes a central element, for example a sheet, bar or other part with suitable geometry, of soft magnetic material 292, first and second elements of remanent magnetic material 293, for example sheets, bars or other parts with suitable geometry, which run through an electromagnetic coil 294 and a two-piece magnetic material loop 295 (or "yoke") comprising a generally 'U'-shaped portion 296 and a cover portion 297. The pole piece 292 comprises soft magnetic material. The central element 292 provides a central magnetic pole.

The pole piece 292 can be sandwiched between two PCBs 244 which electrically insulate the pole piece 292.

The insert 204 also includes an electric field measurement arrangement comprising first and second electrodes 298 and first and second electrode connecting rods 299. The connecting rods 299 and coil connecting wires 300 are connected to a flexi connector 301. The electrodes 298 and electrode connecting rods preferably comprise graphite.

The electrodes 298 are generally triangular prism shaped is disposed in the respective triangle-shaped channel portions 268. The electrodes 298 may be other shapes, such as, for example, strips, bars, rods or the like. The connecting rods 299 pass through respective through holes (not shown) in the dividing floor 247 and mate with blind holes (not shown) in the respective electrodes 298.

The pole piece 292 is disposed in the lower inner frame channel 265 and the coil 294 is disposed in the upper inner frame channel 263. The two-piece magnetic material loop 295 sits in the outer frame space 270. The insert 204 may be filled with potting material 302.

Figure 16:
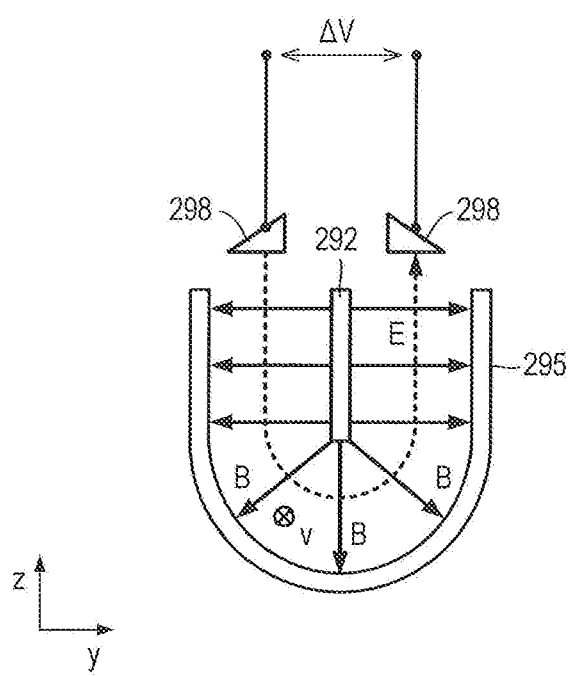
FIG. 16 illustrates magnetic field generated by the magnetic circuit in the flow measurement element shown in FIG. 14 and an electric field generated when water flows through the flow measurement element.

Referring to FIG. 16, in this arrangement, magnetic field B passes laterally and radially downwardly from the pole piece 292 towards the magnetic material loop 295. Flow of water through the magnetic field filled space causes an electric field to be generated which is sensed by the electrodes 298.

Modifications

It will be appreciated that various modifications may be made to the embodiments hereinbefore described. Such modifications may involve equivalent and other features which are already known in the design, manufacture and use of electromagnetic flow meter and component parts thereof and which may be used instead of or in addition to features already described herein. Features of one embodiment may be replaced or supplemented by features of another embodiment.

Mounting

The flow meter sub-assembly need not be detachably mountable to the housing using a bayonet connector. Other forms for detachable connector, for example similar to those used for detachable hosepipe connections, can be used. Moreover, the flow meter sub-assembly can be permanently mounted.

Flow Conditioning

Different geometries of flow conditioning elements are possible, particularly for the larger sizes. The typical lay lengths of the larger meters provide ample space to manage the flow profiles such that the insertion element itself sees the same flow rate regardless of upstream or downstream conditions.

Electrodes

Multiple measurement electrodes can be used on the insertion element. These can either be connected in parallel subject to geometry, or they may simply be connected to additional electrode inputs in the electronics. This latter arrangement provides a means to manage severe non-uniformity of flow profile, by allowing arbitrary combinations of signals from multiple sets of distributed electrodes to be combined together in software to synthesize a flow-profile immune sensor. Other commonly-used electrode materials may be used, independent of the features of this invention.

Magnetics

Magnetic field can be generated using remanent elements, conventional solenoids, or other bi-stable or rotating magnetic components. The operating mode of the meter (field vs. time) may be varied, independent of the core features of this invention.

Materials

Soft magnetic parts (for example, the pole pieces) may be made from electrical steel, soft ferrite, magnetic stainless steels, such as 9CR (available from Vacuumschmelze GmbH & Co. KG, Germany), Chrome Core 12FM, and the like. Soft magnetic parts can be made from non stainless steels or other corrodible materials, such as CoFe, provided they have a protective coating or employ some other way of avoiding rusting or other corrosion.

Semi-hard part material (that is, the remanent elements) may comprise SENSORVAC® (available from Vacuumschmelze GmbH & Co. KG, Germany) or the like.

Electrodes may be made from graphite, platinum, gold, silver/silver chloride, conductive plastic, stainless steel etc.

Insulation may be formed from a plastic such as PPS, ABS or acrylic, glass, epoxy, paint, varnish, oxide, or a powder coat (for example polyester).

Parts of the sensor may be made from (non-magnetic) brass or 316L stainless, power-coated cast or ductile iron and/or (magnetic) magnetic stainless, such as 12FM (available from Ugitech). Any water compatible polymers, including PPS, polyamide, polypropylene, may be used for wetted electrically and magnetically inert parts.

Magnetic stainless steel can act both as a water ground and as a magnetic screen, and as the outer pole piece in an inner pole/outer pole geometry. Ground may be electrical safety ground continuity across the meter and/or electrical reference point connected to the electronics to provide immunity to common mode electrical interference.

The meter can be used to measure the flow of other forms of conductive liquid, such as an ionic liquid.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. An electromagnetic flow sensor for an electromagnetic flow meter, the electromagnetic flow sensor comprising:
    a body or frame;
    a passage through the body or frame;
    at least part of a magnetic circuit supported by the body or frame for directing a magnetic field across the passage; and
    at least first and second electrodes supported by the body or frame, the at least first and second electrodes arranged to sense a voltage in response to a conductive fluid flowing through the passage;
    wherein the at least part of the magnetic circuit comprises:
       a central pole piece; and
       outer pole piece(s) extending around the central pole piece and the passage so as to serve as a magnetic screen from an external magnetic field;
    wherein the passage has a central protrusion extending into and along the passage so as to present a profile to the flow of the conductive fluid which turns back on itself, wherein the central protrusion is electrically insulated and includes the central pole piece.

2. An electromagnetic flow sensor according to claim 1, wherein at least a portion of the body or frame supporting the part of the magnetic circuit and the at least first and second electrodes are configured to be insertable into a flow tube through a single aperture in the flow tube.

3. An electromagnetic flow sensor according to claim 1, comprising
electrically-conductive parts which are not the at least first and second electrodes;
wherein the body or frame is, in use, in direct contact with the conductive fluid and the electrically-conductive parts are electrically insulated from the conductive fluid.

4. A sub-assembly comprising:
an electromagnetic flow sensor according to claim 1; and
a meter register;
wherein the electromagnetic flow sensor and the meter register form a single unit.

5. A sub-assembly according to claim 4, wherein the part of the magnetic circuit and the at least first and second electrodes are integrally formed in the meter register.

6. A sensor according to claim 1, wherein the at least part of the magnetic circuit is electrically insulated from the conductive fluid.

7. An electromagnetic flow meter comprising:
a sensor according to claim 1.

8. An electromagnetic flow meter comprising:
a tubular fluid housing having a fluid housing wall and a fluid housing aperture in the fluid housing wall; and
an electromagnetic flow sensor having a body or frame; a passage through the body or frame; a part of a magnetic circuit supported by the body or frame for directing a magnetic field across the passage; and at least first and second electrodes supported by the body or frame, the at least first and second electrodes arranged to sense a voltage in response to an conductive fluid flowing through the passage; wherein at least a portion of the body or frame supporting the magnetic circuit part and the at least first and second electrodes are configured to be insertable into a flow tube through a single aperture in the flow tube
wherein the electromagnetic flow meter is a whole flow meter.

9. An electromagnetic flow meter according to claim 8, wherein the electromagnetic flow sensor is removably inserted in the tubular fluid housing.

10. An electromagnetic flow meter according to claim 8, wherein the tubular fluid housing is a T-piece pipe.

11. An electromagnetic flow meter according to claim 8, wherein the electromagnetic flow meter has a meter body configured to provide electrical safety ground continuity across the electromagnetic flow meter.

12. An electromagnetic flow meter according to claim 11, wherein the meter body is configured to provide an electrical reference point for an electronic module.

13. An electromagnetic flow meter comprising:
a tubular fluid housing having a fluid housing wall and a fluid housing aperture in the fluid housing wall;
a conditioning tube disposed within the tubular fluid housing and having a fluid conditioning tube wall and a conditioning tube aperture in the fluid conditioning tube wall; and
an electromagnetic flow sensor having a body or frame; a passage through the body or frame; a part of a magnetic circuit supported by the body or frame for directing a magnetic field across the passage; and at least first and second electrodes supported by the body or frame, the at least first and second electrodes arranged to sense a voltage in response to an conductive fluid flowing through the passage; wherein at least a portion of the body or frame supporting the magnetic circuit part and the at least first and second electrodes are configured to be insertable into a flow tube through a single aperture in the flow tube.

14. An electromagnetic flow meter comprising:
a tubular fluid housing having a fluid housing wall and a fluid housing aperture in the fluid housing wall;
a conditioning tube disposed within the tubular fluid housing and having a fluid conditioning tube wall and a conditioning tube aperture in the fluid conditioning tube wall; and
a sub-assembly having an electromagnetic flow sensor and a meter register, wherein the electromagnetic flow sensor and the meter register form a single unit, the electromagnetic flow sensor inserted in the tubular fluid housing so as to at least partially pass through the fluid housing aperture and to at least partially pass through the conditioning tube aperture.

\* \* \* \* \*